Nov. 30, 1948.  L. R. HALL  2,455,005
INTERNAL PIPE WRENCH
Filed Oct. 30, 1945
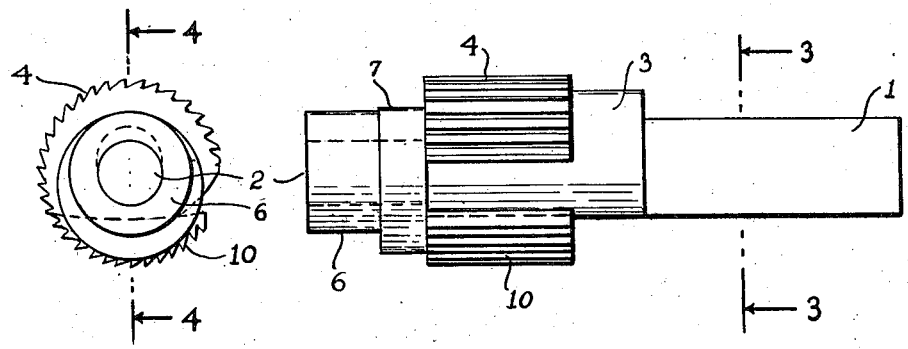
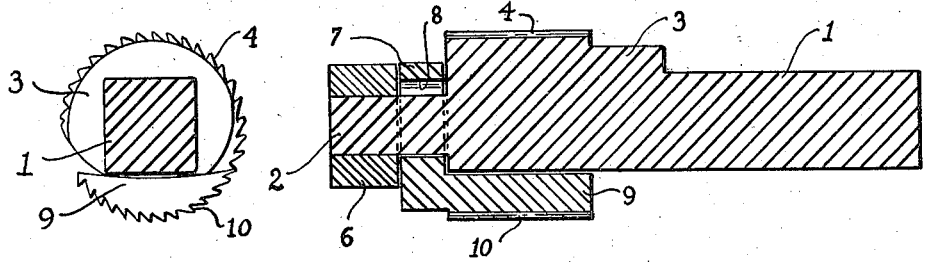
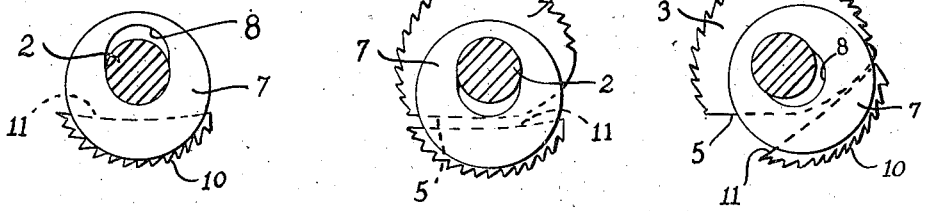
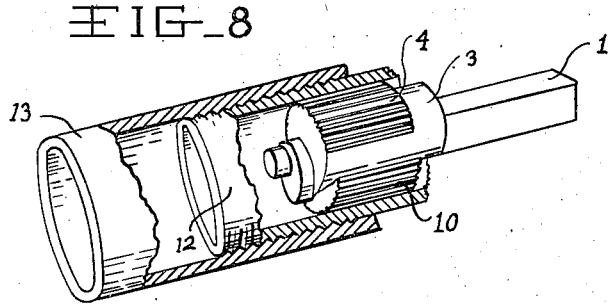
INVENTOR
LEE R. HALL
BY
Otany P Schwartz
HIS ATTORNEY Patented Nov. 30, 1948

2,455,005

UNITED STATES PATENT OFFICE 2,455,005

INTERNAL PIPE WRENCH

Lee R. Hall, Tonasket, Wash.

Application October 30, 1945, Serial No. 625,576

1 Claim. (Cl. 81—72)

This invention relates to plumbers' tools, the main object being to provide a hand tool by means of which broken pieces of pipe may be readily removed from within pipe fittings such as elbows, T's, etc.

In the drawings:

Fig. 1 is an end elevation of the tool.

Fig. 2 is a side elevation of the same.

Fig. 3 is a cross section on line 3—3 of Fig. 2.

Fig. 4 is a sectional elevation of the tool on line 4—4 of Fig. 1.

Fig. 5 is an end section showing only the relatively movable gripping member.

Fig. 6 is a similar view but showing both the relatively fixed and movable gripping members in their normal position.

Fig. 7 is a similar view, showing the relative positioning of the members when shifted by rotation of the tool.

Fig. 8 is a broken-out perspective showing the tool in operation.

Referring to the numerals of reference on the drawings, the tool comprises a square shank 1 for engagement with a wrench or the like and having a reduced size circular stub shaft 2 on its outer end. Just ahead of the shaft 2 is an enlarged segmental portion 3 formed with sharp-edged peripheral teeth 4 concentric with the axis of shaft 2.

These teeth extend for substantially 180 degrees, the remaining opposite surface of member 3 being smooth and flat and forming a cam 5 relatively close to and eccentric with said shaft.

Fixed on shaft 2 at its outer end is a collar 6 which retains a hub 7 on said shaft, the hub having an elongated slot 8 in which said shaft is turnable and radially movable.

Formed with the hub in offset relation thereto so as to overhang cam surface 5 is a segmental member 9 having short edge teeth 10 concentric with shaft 2 when the latter is in the adjacent end of the slot 8; said slot extending at right angles to the chord of segment 9. The face 11 of member 9 opposite teeth 10, or that facing cam surface 5, is symmetrical with said surface and contacts the same when shaft 2 is at the adjacent end of slot 8.

From the above description, it will be seen that the toothed segments when in contact, form a substantially continuous gripping surface concentric with the axis of rotation of the tool.

The diameter of this gripping surface is less than the internal diameter of the pipe 12 to be removed, and when the tool is inserted in the pipe and the shank 1 is rotated, the cooperating cam surfaces, turning relative to each other, cause the opposed tooth segments to be moved apart and the diameter of the gripping surface to be increased as shown in Fig. 7. The relative movement is, of course, effected when segment 9 frictionally grips the pipe and is temporarily held stationary. The pipe is thus firmly gripped and upon continued rotation of the tool, will be withdrawn from fitting 13.

I claim:

An internal pipe wrench comprising a shank; a main segmental gripping member integral with said shank formed at its outer end; a stub shaft projecting from the outer end of the shank the central longitudinal axis of said stub shaft coinciding with that of the shank; a movable segmental gripping member opposed to the main gripping member; an offset hub integral with said movable segmental gripping member; said hub having a slot through which said stub shaft projects; said gripping members having their peripheral surfaces fluted to form longitudinally extending teeth concentric with the central longitudinal axis of said shank; said main segmental gripping member having a cam surface; said movable segmental gripping member having an inner surface cooperating with said cam surface for moving said movable segmental gripping member outwardly radially when the latter is rotated about said stub shaft.

LEE R. HALL.

REFERENCES CITED

The following references are of record in the file of this patent:

UNITED STATES PATENTS

| Number | Name | Date |
|---|---|---|
| 122,006 | Gillies | Dec. 19, 1871 |
| 141,794 | Johnson | Aug. 12, 1873 |
| 214,755 | Bump | Apr. 29, 1879 |
| 218,106 | Ackerman | Aug. 5, 1879 |
| 785,162 | Freytag | Mar. 21, 1905 |
| 1,152,195 | Maxwell | Aug. 31, 1915 |
| 1,251,408 | Murray | Dec. 25, 1917 |
| 1,518,087 | McMullen | Dec. 2, 1924 |
| 1,672,053 | Brown | June 5, 1928 |
| 1,701,409 | Himes | Feb. 5, 1929 |